(12) United States Patent
Shibabuki

(10) Patent No.: US 6,549,273 B2
(45) Date of Patent: Apr. 15, 2003

(54) METHOD OF CONTROLLING DEVICE FOR FEEDING SHEET-LIKE MEMBER IN AUXILIARY SCANNING DIRECTION

(75) Inventor: Tadanobu Shibabuki, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/965,820

(22) Filed: Oct. 1, 2001

(65) Prior Publication Data

US 2002/0038935 A1 Apr. 4, 2002

(30) Foreign Application Priority Data

Sep. 29, 2000 (JP) .......................... 2000-298248

(51) Int. Cl.⁷ .......................... G03B 27/00; G03B 27/52
(52) U.S. Cl. .......................... 355/405; 355/40
(58) Field of Search .......................... 355/23, 27–29, 355/40–41, 405, 407; 101/232, 216; 271/272

(56) References Cited

U.S. PATENT DOCUMENTS 3,988,062 A * 10/1976 Burton et al. .................. 355/23
4,627,718 A * 12/1986 Wyer .......................... 355/35
5,002,366 A * 3/1991 Okazaki ..................... 350/321

\* cited by examiner

Primary Examiner—Hung Henry Nguyen
(74) Attorney, Agent, or Firm—Sughrue Mion, PLLC

(57) ABSTRACT

A belt is rotated in the direction indicated by the arrow (F) by a motor to cause first and second feed roller pairs to feed a stimulable phosphor sheet in the direction indicated by the arrow (X2). Before the stimulable phosphor sheet is scanned by a light beam, the belt is rotated a predetermined length in the direction indicated by the arrow (E) by the motor. Thereafter, the belt is rotated to cause the first and second feed roller pairs to feed the stimulable phosphor sheet in the auxiliary scanning direction indicated by the arrow (X1). When the stimulable phosphor sheet is scanned by a light beam, the belt is stably held in a desired position on the driven pulley, but is not slid sideways, allowing the stimulable phosphor sheet to be fed highly accurately in the auxiliary scanning direction.

4 Claims, 5 Drawing Sheets

METHOD OF CONTROLLING DEVICE FOR FEEDING SHEET-LIKE MEMBER IN AUXILIARY SCANNING DIRECTION

BACKGROUND OF THE INVENTION

1. Field of the Invention

The present invention relates to a method of controlling a device for feeding a sheet-like member reciprocally with a belt engaging a rotary actuator and also feeding the sheet-like member in an auxiliary scanning direction when the sheet-like member is scanned with a light beam.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display device such as a CRT or the like.

The stimulable phosphor is a phosphor which, when exposed to an applied radiation (X-rays, α-rays, γ-rays, electron beams, ultraviolet radiation, or the like), stores a part of the energy of the radiation, and, when subsequently exposed to applied stimulating rays such as visible light, emits light in proportion to the stored energy of the radiation. Usually, a sheet provided with a layer of the stimulable phosphor is used as a stimulable phosphor sheet.

The above known system includes an image information reading apparatus which comprises a loading unit for accommodating a cassette which stores a stimulable phosphor sheet with the radiation image information of a subject being recorded thereon, a reading unit for photoelectrically reading the recorded radiation image information carried on the stimulable phosphor sheet that has been removed from the cassette, and an erasing unit for erasing residual radiation image information remaining on the stimulable phosphor sheet.

The system also includes an image information reproducing apparatus for recording the radiation image information read from the stimulable phosphor sheet on a photographic film (sheet-like member). The image information reproducing apparatus comprises a loading unit for accommodating a container such as a cassette, a magazine, or the like which stores a photographic film, and a recording unit (scanning unit) for recording radiation image information on the photographic film.

Each of the reading unit and the recording unit incorporates an auxiliary scanning feeding device for feeding the sheet-like member in an auxiliary scanning direction when a laser beam as stimulating light or recording light is applied to the sheet-like member in a main scanning direction which is substantially perpendicular to the auxiliary scanning direction.

FIG. 5 of the accompanying drawings shows in plan a general auxiliary scanning feeding device 1. As shown in FIG. 5, the auxiliary scanning feeding device 1 has two feed rollers pairs 2a, 2b spaced a certain distance from each other. A belt and pulley mechanism 5 is mounted on a rotatable shaft 4a of a drive roller 3a of the feed roller pair 2a and a rotatable shaft 4b of a drive roller 3b of the feed roller pair 2b. A driven pulley 6 is also fixedly mounted on the rotatable shaft 4a. An endless belt 9 is trained around the driven pulley 6 and a drive pulley 8 that is fixedly mounted on the drive shaft of a motor 7.

When the motor 7 is energized to rotate the drive shaft thereof in one direction, the feed roller pairs 2a, 2b are rotated in one direction synchronously with each other. A sheet-like member, e.g., a stimulable phosphor sheet S, is fed in an auxiliary scanning direction indicated by the arrow A by the feed roller pairs 2a, 2b while stimulating light (not shown) is being applied to the stimulable phosphor sheet S. Upon exposure to the stimulating light, the stimulable phosphor sheet S emits light representing radiation image information recorded thereon, which is photoelectrically read. Thereafter, the motor 7 is energized to rotate the drive shaft thereon in the opposite direction, causing the feed roller pairs 2a, 2b to feed the stimulable phosphor sheet S in the direction indicated by the arrow B until the stimulable phosphor sheet S is discharged out of the auxiliary scanning feeding device 1.

The auxiliary scanning feeding device 1 employs the belt 9 as a transmitting means for transmitting the rotational power of the motor 7 to the feed roller pairs 2a, 2b. The belt 9 may possibly slide or sway sideways in different directions when the stimulable phosphor sheet S is fed forward in the direction indicated by the arrow A and backward in the direction indicated by the arrow B. For example, when the stimulable phosphor sheet S is fed forward in the direction indicated by the arrow A, the belt 9 may slide or sway sideways in the direction indicated by the arrow C across the driven pulley 6, and when the stimulable phosphor sheet S is fed backward in the direction indicated by the arrow B, the belt 9 may slide or sway sideways in the direction indicated by the arrow D across the driven pulley 6.

Therefore, even though the stimulable phosphor sheet S needs to be fed highly accurately in the auxiliary scanning direction indicated by the arrow A, the drive rollers 3a, 3b of the feed roller pairs 2a, 2b tend to suffer rotation irregularities due to the lateral sliding of the belt 9 on the driven pulley 6. When the drive rollers 3a, 3b are subjected to rotation irregularities, the image read from the stimulable phosphor sheet S also suffers image irregularities or distortions, and hence the radiation image information recorded on the stimulable phosphor sheet S cannot be read highly accurately.

SUMMARY OF THE INVENTION

It is a major object of the present invention to provide a method of controlling a device for feeding a sheet-like member in an auxiliary scanning direction by canceling out, in advance, the effect of a lateral sliding of a belt engaging a rotary actuator according to a simple control process, for thereby feeding the sheet-like member highly accurately and smoothly in the auxiliary scanning direction.

According to the present invention, a rotary actuator is rotated in a first direction to rotate a belt to feed a sheet-like member in another direction. Before the sheet-like member is scanned by a light beam, the rotary actuator is rotated in a second direction which is opposite to the first direction to rotate the belt by a predetermined length. Thereafter, the rotary actuator is rotated in the second direction to rotate the belt to feed the sheet-like member in an auxiliary scanning direction while scanning the sheet-like member with the light beam.

Even if the belt is slid or swayed sideways when the rotary actuator is rotated in the first direction, before the sheet-like member is scanned by the light beam, the rotary actuator is rotated in the second direction to allow the belt to slide or sway sideways in an opposite direction, thus positionally stabilizing the belt. When the sheet-like member is scanned by the light beam, the rotary actuator is rotated in the second direction to rotate the belt in a stable position, thereby making it possible to feed the sheet-like member highly accurately in the auxiliary scanning direction. The sheet-like member can thus be scanned highly accurately. Since the belt which engages the rotary actuator can be used, the entire device for feeding the sheet-like member in the auxiliary scanning direction is easily simplified in structure.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
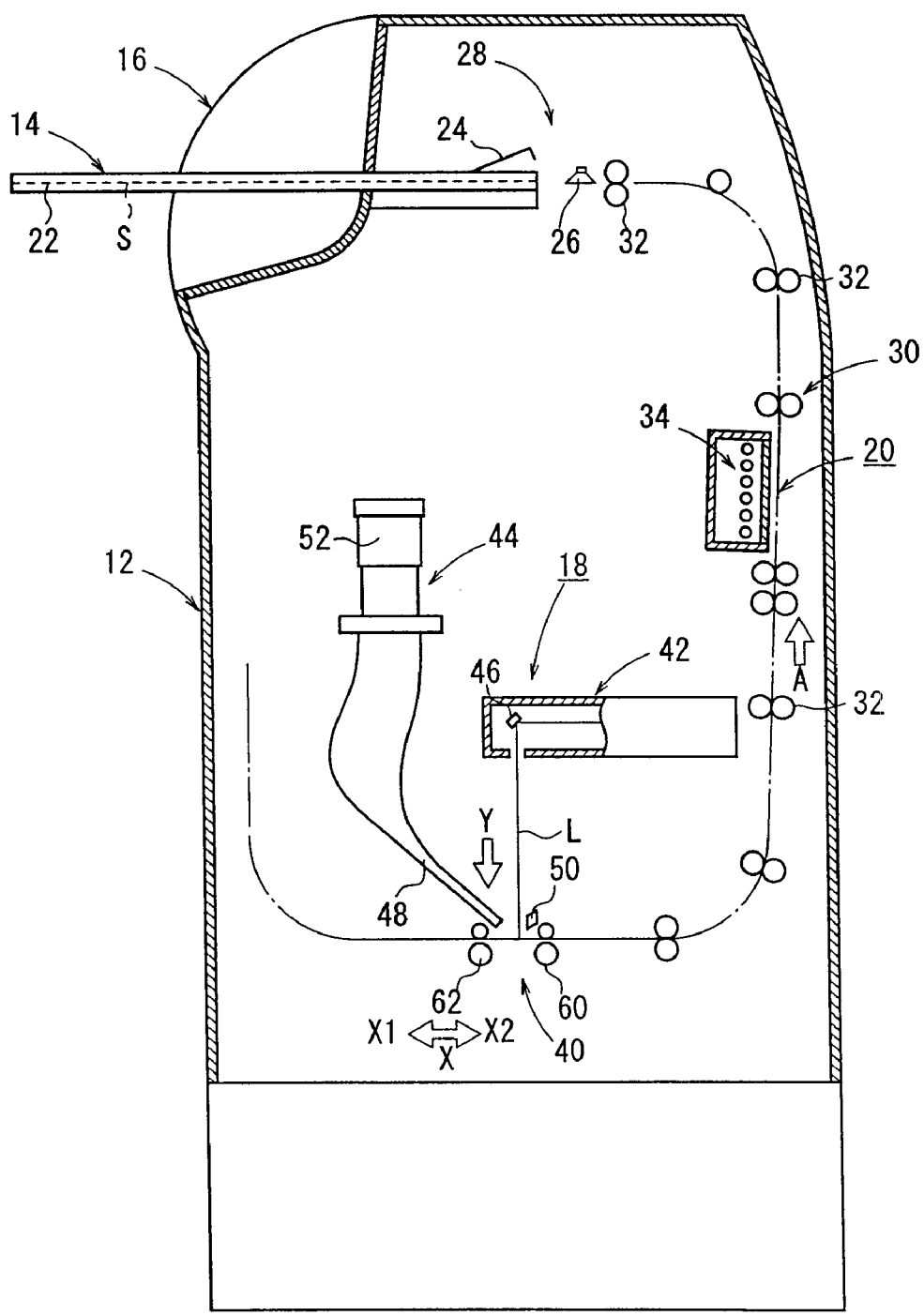
FIG. 1 is a vertical cross-sectional view of an image information reading apparatus which incorporates a device for feeding a sheet-like member in an auxiliary scanning direction that is controlled by a method according to the present invention.

FIG. 1 shows in vertical cross section an image information reading apparatus 10 which incorporates a device for feeding a sheet-like member in an auxiliary scanning direction that is controlled by a method according to the present invention.

As shown in FIG. 1, the image information reading apparatus 10 has an apparatus housing 12 accommodating therein a cassette loading region 16 for holding a cassette 14 which houses a stimulable phosphor sheet S as a sheet-like recording medium with the radiation image information of a subject being temporarily recorded thereon, a reading unit 18 for applying a laser beam L as stimulating light to the stimulable phosphor sheet S with the radiation image information recorded thereon to photoelectrically read the radiation image information, and an erasing unit 20 for erasing residual radiation image information that remains on the stimulable phosphor sheet S after the recorded radiation image information has been read therefrom by the reading unit 18.

The cassette 14 comprises a casing 22 for housing the stimulable phosphor sheet S therein, and a lid 24 openably and closably mounted on an end of the casing 22 for removing the stimulable phosphor sheet S from and inserting the stimulable phosphor sheet S into the casing 22. The cassette 14 is inserted in a horizontal attitude into the cassette loading region 16. The cassette loading region 16 includes a lid opening/closing means, not shown, for opening and closing the lid 24, and a delivery means 28 having a suction cup 26 for attracting and removing the stimulable phosphor sheet S from the cassette 14 and returning the stimulable phosphor sheet S, from which the recorded radiation image information has been read and the residual radiation image information has been erased, into the cassette 14.

The erasing unit 20 and the reading unit 18 are disposed downstream of the delivery means 28 with a reciprocating feed system 30 extending therebetween. The reciprocating feed system 30 has a plurality of roller pairs 32 providing a vertical feed path on which the erasing unit 20 is positioned and a horizontal feed path on which the reading unit 18 is positioned. The erasing unit 20 comprises a plurality of horizontal erasing light sources 34. Alternatively, the erasing unit 20 may comprise a single horizontal erasing light source 34 or may comprise a plurality of vertical erasing light sources 34 or a single vertical erasing light source 34.

The reading unit 18 comprises an auxiliary scanning feed device 40 for reciprocally feeding the stimulable phosphor sheet S in horizontal directions indicated by the arrows X (X1, X2), a laser beam applying device 42 for applying a laser beam L as scanning light in a substantially vertically downward direction indicated by the arrow Y to the stimulable phosphor sheet S which is being fed in an auxiliary scanning direction indicated by the arrow X1, and a reading device 44 for collecting light emitted from the stimulable phosphor sheet S upon exposure to the laser beam L to photoelectrically read radiation image information carried on the stimulable phosphor sheet S.

The laser beam applying device 42 has an optical system 46 for bending the laser beam L, which has been emitted horizontally from a laser beam source, substantially vertically downwardly to apply the laser beam L to the stimulable phosphor sheet S. A light guide 48 and a reflecting mirror 50 for collecting the light emitted from the stimulable phosphor sheet S upon exposure to the laser beam L are disposed in the vicinity of an area where the stimulable phosphor sheet S is irradiated by the laser beam L. The reading device 44 includes a photomultiplier 52 connected to the light guide 48.

Figure 2:
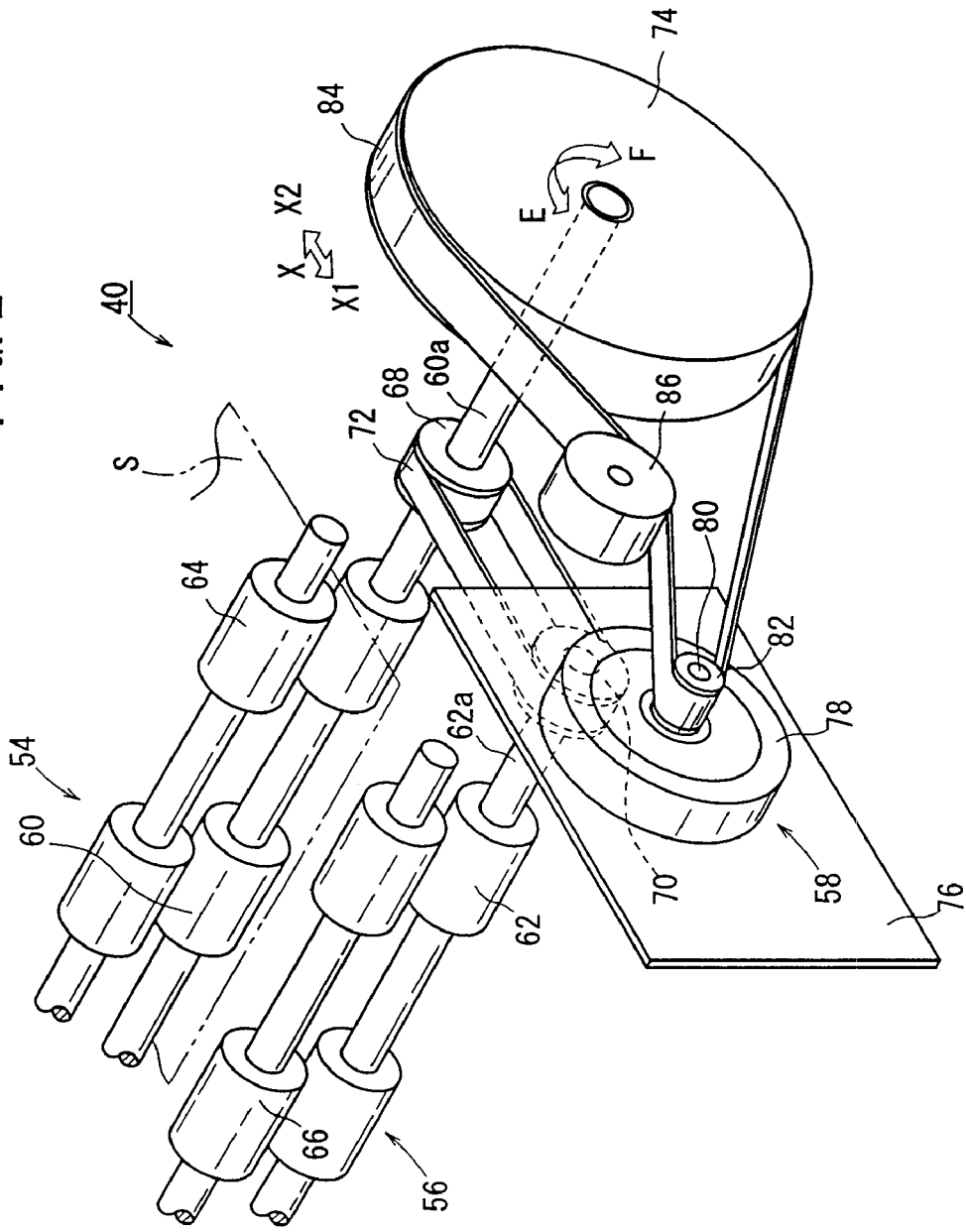
FIG. 2 is a perspective view of the device for feeding a sheet-like member in an auxiliary scanning direction.
Figure 3:
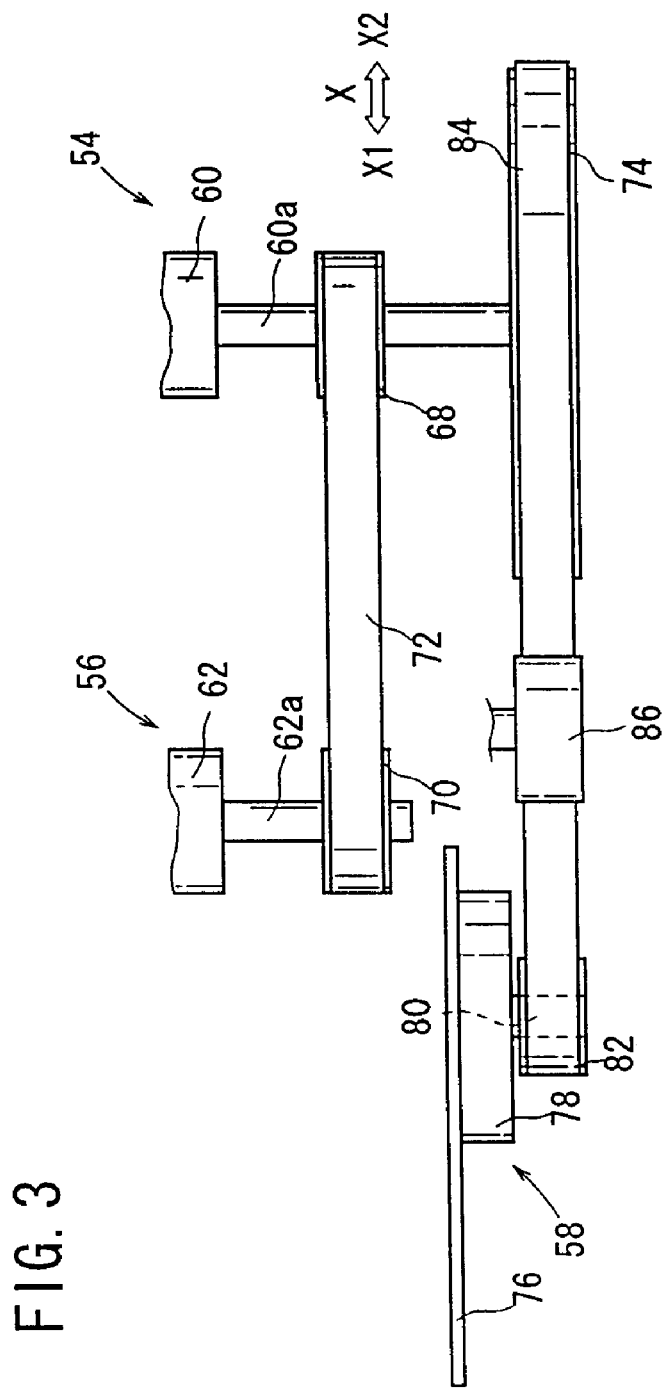
FIG. 3 is a plan view of the device for feeding a sheet-like member in an auxiliary scanning direction.
Figure 4:
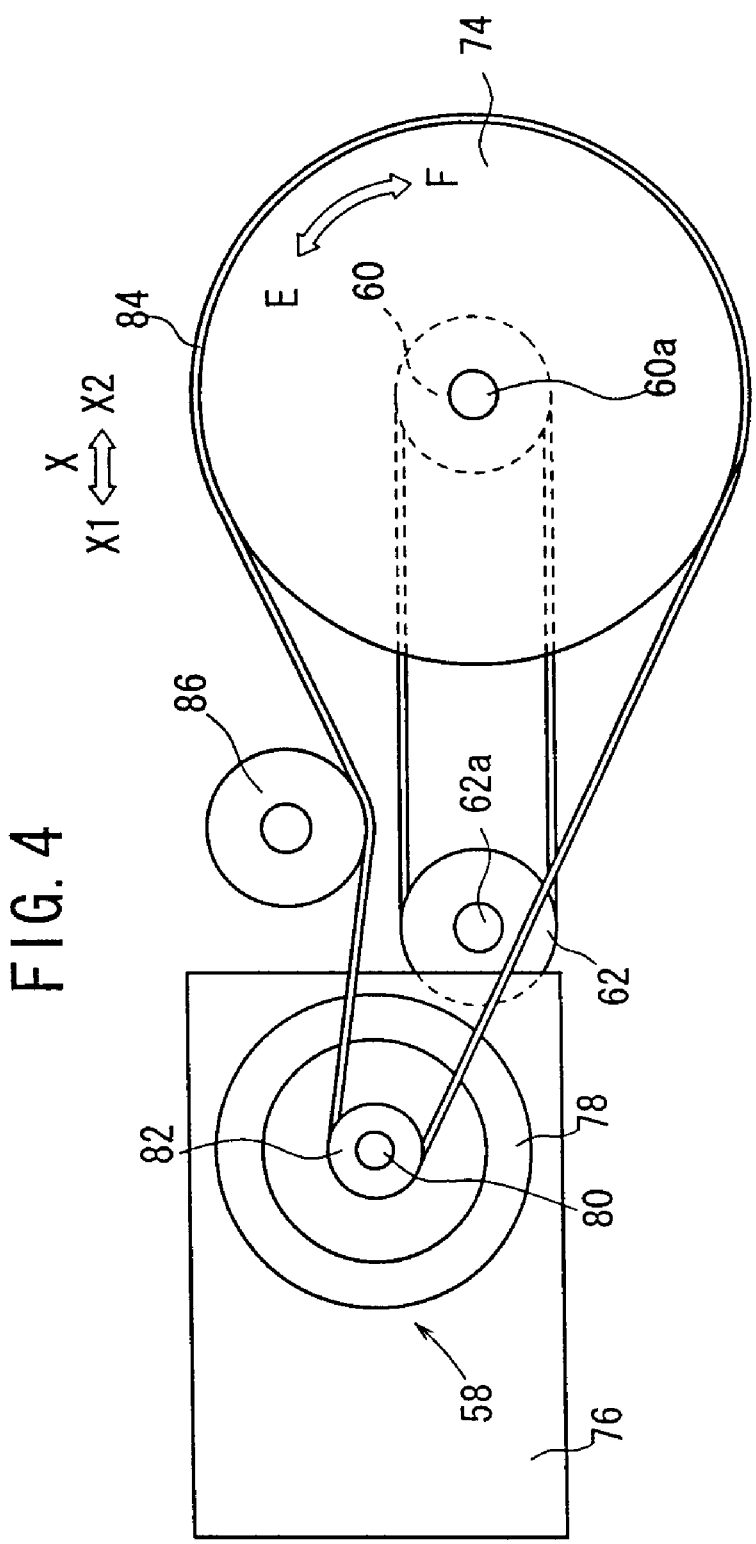
FIG. 4 is a front elevational view of the device for feeding a sheet-like member in an auxiliary scanning direction.
Figure 5:
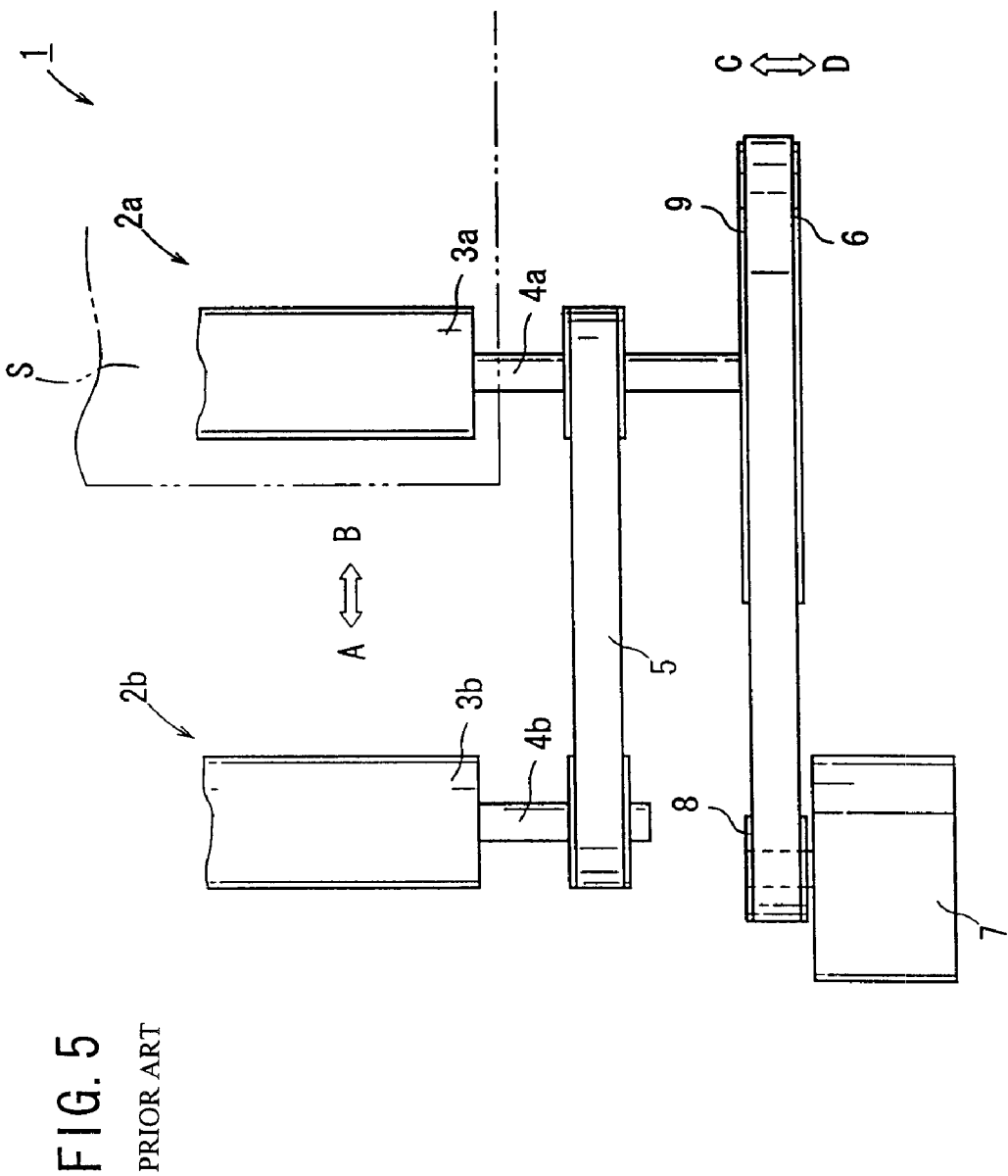
FIG. 5 is a plan view of a conventional auxiliary scanning feeding device.

As shown in FIGS. 2 through 4, the auxiliary scanning feed device 40 comprises first and second feed roller pairs 54, 56 for gripping and feeding the stimulable phosphor sheet S, and a drive means 58 for rotating the first and second feed roller pairs 54, 56 selectively in one direction and the other. The first and second feed roller pairs 54, 56 comprise respective drive rollers 60, 62 and respective nip rollers 64, 66 movable toward and away from the drive rollers 60, 62. The drive rollers 60, 62 have respective rotatable shafts 60a, 62a with respective pulleys 68, 70 fixedly mounted thereon. An endless belt 72 is trained around the pulleys 68, 70 for rotating the drive rollers 60, 62 in synchronism with each other.

The drive means 58 has a larger-diameter driven pulley 74 fixedly mounted on an end of the rotatable shaft 60a, a motor (rotary actuator) 78 mounted on a board 76, and a smaller-diameter drive pulley 82 fixedly mounted on an output shaft of the motor 78. An endless belt 84 is trained around the drive pulley 82 and the driven pulley 74, and engaged by a tension roller 86 between the drive pulley 82 and the driven pulley 74.

Operation of the image information reading apparatus 10 will be described below.

A cassette 14 is horizontally inserted into the cassette loading region 16 which is disposed in an upper region of the apparatus housing 12. The cassette 14 stores a stimulable phosphor sheet S which carries radiation image information of a subject, not shown, recorded thereon. The lid 24 of the inserted cassette 14 is opened by the lid opening/closing means in the cassette loading region 16.

Then, the delivery means 28 is actuated to move the suction cup 26 into the cassette 14, and the suction cup 26 attracts an upper surface of the stimulable phosphor sheet S in the cassette 14. The suction cup 26 is then displaced out of the cassette 14 toward the reciprocating feed system 30, removing the stimulable phosphor sheet S from the cassette 14. The suction cup 26 releases the stimulable phosphor sheet S substantially at the same time that the leading end of the stimulable phosphor sheet S removed from the cassette 14 is gripped by the first roller pair 32 of the reciprocating feed system 30.

The stimulable phosphor sheet S is then fed vertically downwardly along the vertical feed path and then horizontally along the horizontal feed path when the roller pairs 32 rotate. The stimulable phosphor sheet S passes through the erasing unit 20 and is then introduced into the auxiliary scanning feed device 40 of the reading unit 18.

In the auxiliary scanning feed device 40, the drive means 58 is actuated in advance before the stimulable phosphor sheet S is fed in the auxiliary scanning direction indicated by the arrow X1 by the first and second feed roller pairs 54, 56. Specifically, the motor 78 of the drive means 58 is energized to rotate in one direction (second direction), rotating the drive pulley 82 fixedly mounted on the output shaft 80 to rotate the belt 84 together with the driven pulley 74 in the direction indicated by the arrow E. The direction indicated by the arrow E is the same as the auxiliary scanning direction indicated by the arrow X1 in which the stimulable phosphor sheet S is fed. The belt 84 is transported a certain length, e.g., a length large enough to cause the driven pulley 74 to make at least one revolution.

Then, when the stimulable phosphor sheet S is fed to the first feed roller pair 54, the motor 78 is energized to cause the drive pulley 82 and the belt 84 to rotate the driven pulley 74 in the direction indicated by the arrow E, rotating the drive roller 60, to which the driven pulley 74 is fixed, in the direction indicated by the arrow E. Since the drive roller 62 is operatively coupled to the drive roller 60 by the pulley 68, the belt 72, and the pulley 70, the first and second feed roller pairs 54, 56 are rotated in synchronism with each other when the motor 78 is energized.

Therefore, the stimulable phosphor sheet S is gripped by the first and second feed roller pairs 54, 56 and fed in the auxiliary scanning direction (horizontal direction) indicated by the arrow X1, while at the same time the laser beam L is emitted from the laser beam applying device 42 (see FIG. 1). The laser beam L, which has traveled horizontally in the laser beam applying device 42, is oriented to travel substantially vertically downwardly as indicated by the arrow Y by the optical system 46, and applied to the recording surface of the stimulable phosphor sheet S to scan the stimulable phosphor sheet S in the main scanning direction. Upon exposure to the laser beam L, the stimulable phosphor sheet S emits light representing the recorded radiation image information. The emitted light is applied directly or by the reflecting mirror 50 to the light guide 48 that guides the light to the photomultiplier 52, which photoelectrically detects the light, thus reading the recorded radiation image information.

After the reading of the radiation image information recorded on the stimulable phosphor sheet S is finished, the motor 78 of the auxiliary scanning feed device 40 is energized to rotate in the opposite direction (first direction), causing the drive pulley 82 and the belt 84 to rotate the driven pulley 74 in the direction indicated by the arrow F (opposite to the direction indicated by the arrow E). The first and second feed roller pairs 54, 56 are rotated in the direction indicated by the arrow F, thereby feeding the stimulable phosphor sheet S in the direction indicated by the arrow X2 (another direction).

The stimulable phosphor sheet S is now transferred from the auxiliary scanning feed device 40 to the reciprocating feed system 30, which feeds the stimulable phosphor sheet S vertically upwardly as indicated by the arrow A to the erasing unit 20. In the erasing unit 20, residual radiation image information remaining on the stimulable phosphor sheet S is erased by erasing light emitted from the erasing light sources 34.

Thereafter, the stimulable phosphor sheet S is returned into the cassette 14. The lid 24 is closed, and the cassette 14 is removed from the cassette loading region 16. The radiation image information of a subject is then recorded again on the stimulable phosphor sheet S.

In the present embodiment, before the stimulable phosphor sheet S is fed in the auxiliary scanning direction indicated by the arrow X1 by the first and second feed roller pairs 54, 56, the motor 78 is energized to rotate the belt 84 in the direction indicated by the arrow E by a predetermined length, e.g., a length large enough to cause the driven pulley 74 to make one revolution or more. Consequently, even if the belt 84 has been slid or swayed sideways on the driven pulley 74 in the axial direction thereof when the stimulable phosphor sheet S is discharged in the direction indicated by arrow X2, the motor 78 is energized to rotate in the opposite direction to rotate the belt 84 in the direction indicated by the arrow E, thus returning the belt 84 back to a desired position on the driven pulley 74.

Therefore, when the stimulable phosphor sheet S is fed in the auxiliary scanning direction indicated by the arrow X1 by the first and second feed roller pairs 54, 56, the belt 84 does not slide sideways on the driven pulley 74.

The first and second feed roller pairs 54, 56 are thus rotated highly accurately by the motor 78 through the drive pulley 82, the belt 84, and the driven pulley 74. As a result, the stimulable phosphor sheet S is fed highly accurately in the auxiliary scanning direction by being gripped by the first and second feed roller pairs 54, 56. The radiation image information carried on the stimulable phosphor sheet S is highly accurately read without suffering image irregularities or other defects.

Accordingly, the drive means 58 including the motor 78 and the first and second feed roller pairs 54, 56 are not required to be constructed highly accurately. Therefore, the auxiliary scanning feed device 40 is effectively simplified in overall structure and is made highly inexpensive and economical.

While the stimulable phosphor sheet S has been described as the sheet-like member, the sheet-like member according to the present invention is not limited to the stimulable phosphor sheet S, but may be a photographic film. In addition, the principles of the present invention are also applicable to an image information reproducing apparatus rather than the image information reading apparatus 10.

In the method of controlling the auxiliary scanning feed device according to the present invention, as described above, before the sheet-like member is scanned, the belt is rotated a predetermined length by energizing the rotary actuator to rotate in the auxiliary scanning direction, and thereafter the belt is rotated to feed the sheet-like member in the auxiliary scanning direction when the sheet-like member is scanned. Therefore, even if the belt has been slid or swayed sideways when the sheet-like member is reciprocally fed, the belt can positionally be stabilized simply when it is rotated a predetermined length before the sheet-like member is scanned. Thus, when the sheet-like member is fed in the auxiliary scanning direction, it does not suffer scanning fluctuations due to rotation irregularities, and can be scanned highly accurately with a simple arrangement according to a simple control process.

Although a certain preferred embodiment of the present invention has been shown and described in detail, it should be understood that various changes and modifications may be made therein without departing from the scope of the appended claims.

What is claimed is:

1. A method of controlling a device for feeding a sheet-like member reciprocally with a belt engaging a rotary actuator and also feeding the sheet-like member in an auxiliary scanning direction as one direction when the sheet-like member is scanned with a light beam, comprising:

rotating said rotary actuator in a first direction to rotate said belt to feed said sheet-like member in another direction which corresponds to rotation of the rotary actuator in said first direction;

before said sheet-like member is scanned by the light beam, rotating said rotary actuator in a second direction which is opposite to said first direction to rotate said belt by a predetermined length; and after said belt is rotated by said predetermined length, rotating said rotary actuator in said second direction to rotate said belt to feed said sheet-like member in the auxiliary scanning direction while scanning the sheet-like member with the light beam.

2. A method according to claim 1, wherein said sheet-like member is gripped and fed by a first feed roller pair having a drive roller which supports a driven pulley engaging said belt, and wherein before said sheet-like member is scanned by the light beam, said rotary actuator is rotated in said second direction to rotate said belt by a length large enough to cause said driven pulley to make at least one revolution.

3. A method according to claim 2, wherein said rotary actuator comprises a motor having an output shaft with a drive pulley fixedly mounted thereon, said drive pulley being smaller in diameter than said driven pulley, and wherein said belt is trained around said drive pulley and said driven pulley and is engaged by a tension roller.

4. A method according to claim 2, wherein a second feed roller pair is combined with said first feed roller pair, and said first feed roller pair and said second feed roller pair are rotatable in synchronism with each other by a belt.

* * * * *